Figure 2:
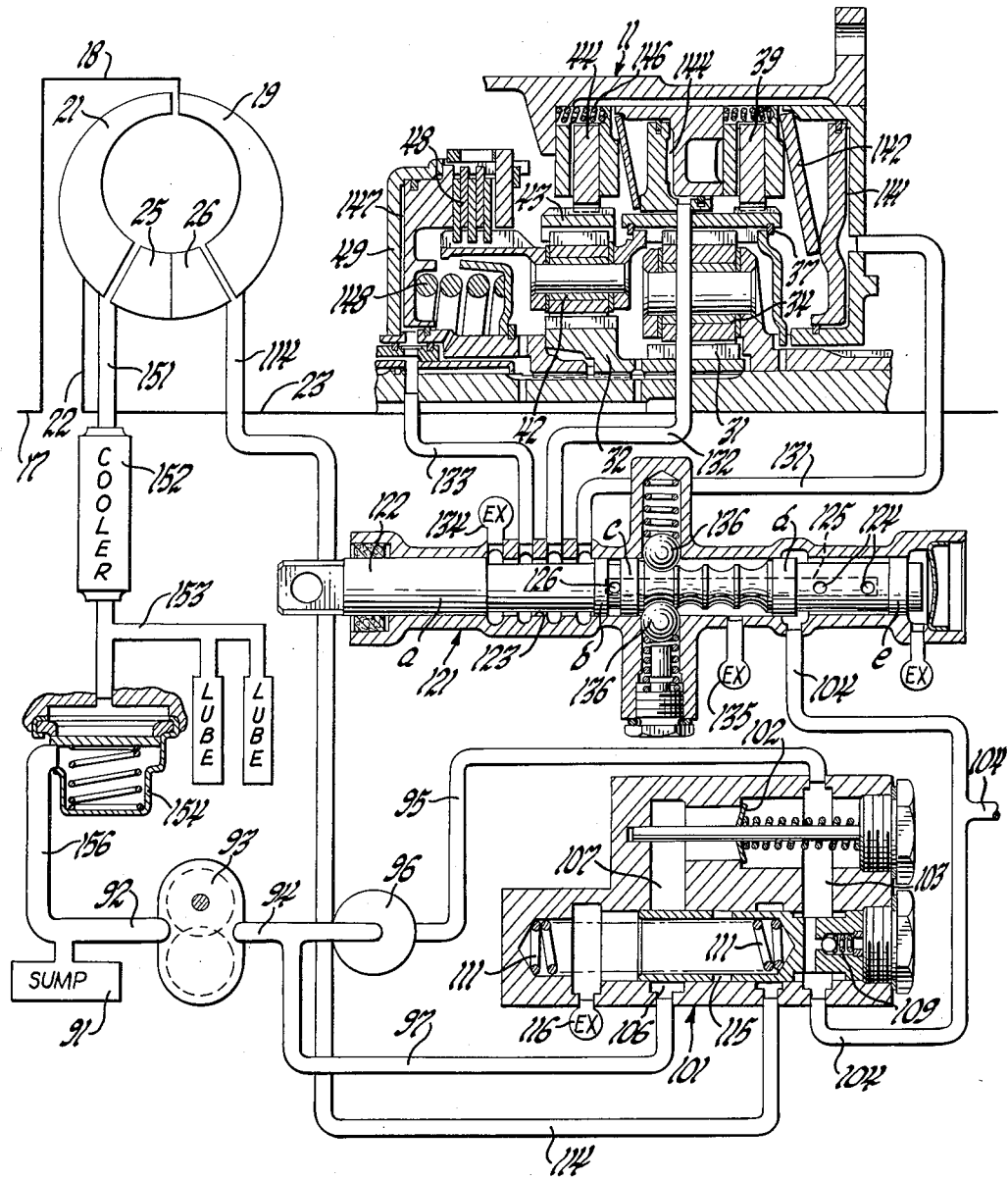

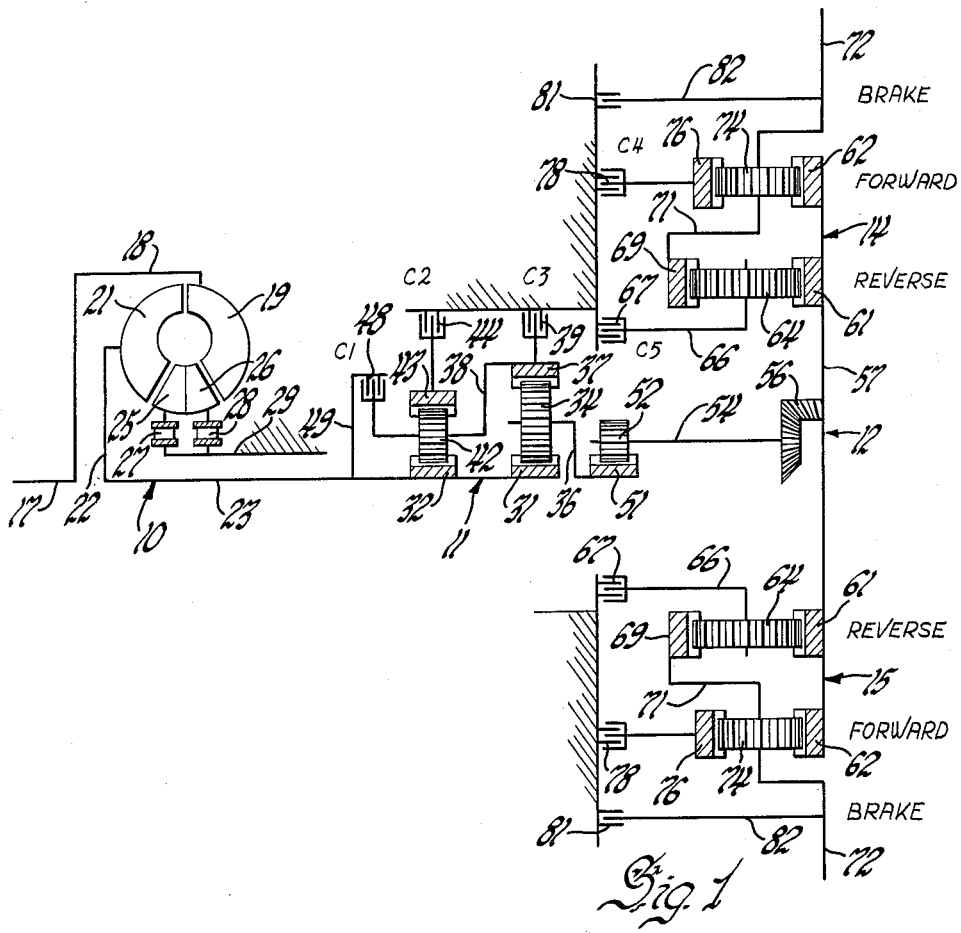
Fig. 1
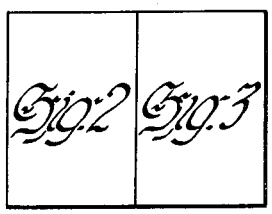
INVENTOR.
Ulysses A. Breting
BY
W. C. Middleton
ATTORNEY June 19, 1962  U. A. BRETING  3,039,327
TRANSMISSION Filed Dec. 28, 1956  3 Sheets-Sheet 2

INVENTOR.
Ulysses A. Breting
BY
W. C. Middleton
ATTORNEY

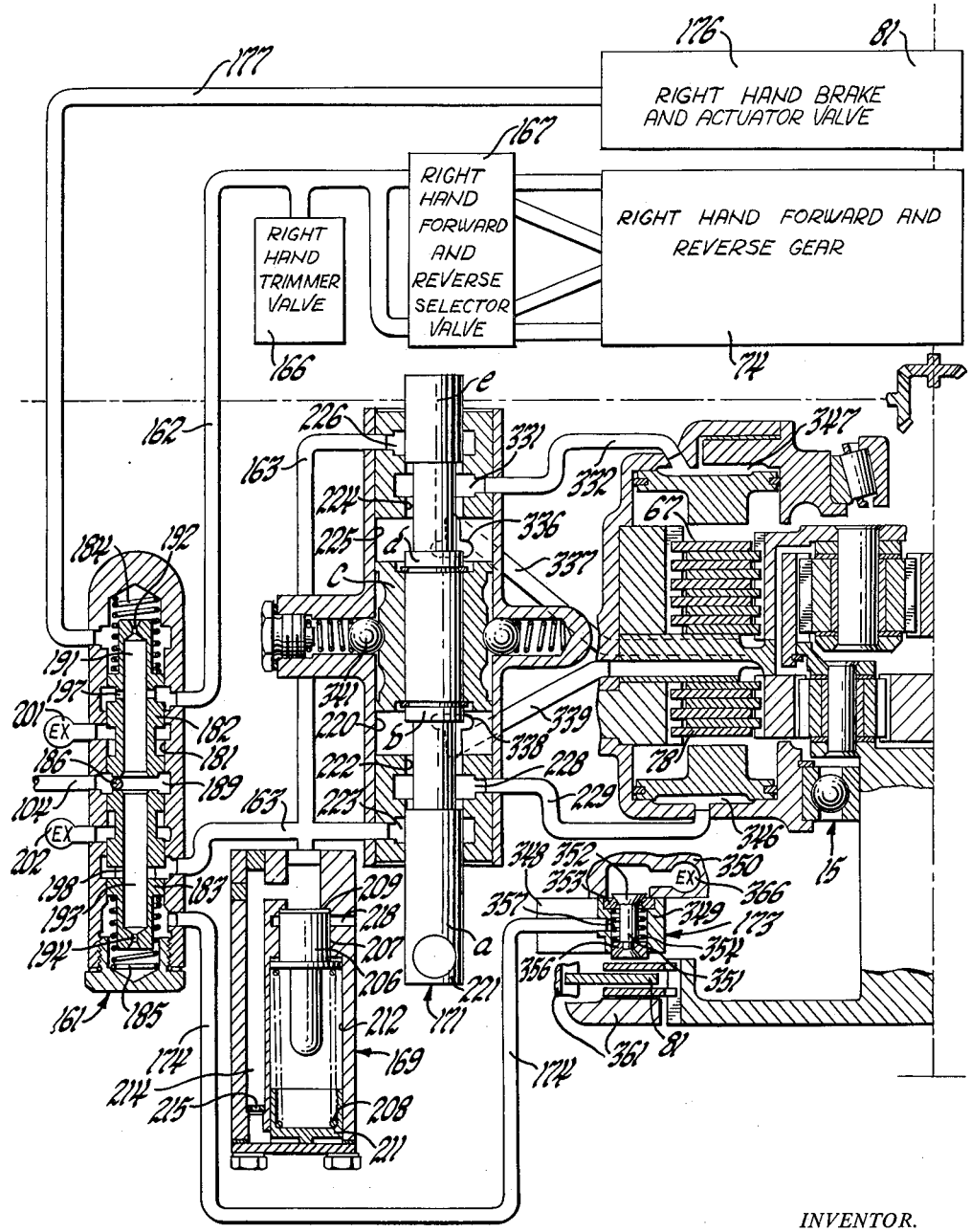

United States Patent Office 3,039,327
Patented June 19, 1962

3,039,327
TRANSMISSION
Ulysses A. Breting, Indianapolis, Ind., assignor to General Motors Corporation, Detroit, Mich., a corporation of Delaware
Filed Dec. 28, 1956, Ser. No. 631,202
21 Claims. (Cl. 74—720.5)

This invention relates to an automatic transmission and more particularly to a combined axial and cross drive transmission assembly in which the cross drive unit has forward and reverse gearing and a vehicle brake and the transmission controls.

This transmission employs a torque converter unit and a three speed unit located coaxially of the vehicle, and a cross drive unit located transversely of the vehicle and having right and left hand forward and reverse gearing and right and left hand brakes. This transmission assembly is controlled by a ratio selector to control the drive ratio provided by the three speed unit, right and left hand forward and reverse selector levers to individually or jointly control the forward or reverse drive in the cross drive unit, and right and left hand brake control levers to individually or jointly apply the right and left hand brakes. An automatic control system responsive to the applications of either brake disables both the forward and reverse drive in the unit which is being braked to provide a neutral condition.

An object of the invention is to provide an automatic transmission assembly having a multi torque ratio drive unit located coaxially of the vehicle to drive a pair of independent forward and reverse units connecting the multiratio drive unit to each drive wheel and a brake for each drive wheel.

Another object of the invention is to provide in a transmission assembly having a forward and a reverse drive and a brake, an automatic control system responsive to the actuation of the brake to place the transmission in neutral condition.

Another object of the invention is to provide in a cross drive transmission having right and left hand gear units providing forward and reverse drive and right and left hand brake units, an automatic control system responsive to the application of either brake to place the drive to that unit in neutral condition.

Another object of the invention is to provide in a transmission assembly having forward and reverse gearing to drive the output shaft and brake to retard rotation of the output shaft, an automatic control system having a flow actuated valve responsive to the application of the brake to place the forward and reverse gearing in neutral position.

These and other objects of the invention will be more fully apparent from the following description and drawing of the preferred embodiment of the invention:

FIGURE 1 is a diagrammatic view of the transmission showing the torque converter and gearing;

FIGURES 2 and 3 when arranged in accordance with the showing in FIGURE 1a, diagrammatically show the transmission assembly including the gear elements and the hydraulic control system therefor.

The transmission employs a torque converter 10 and a three ratio gear unit 11 located axially of the vehicle and a cross drive unit 12 located transversely of the vehicle. The cross drive unit has a right hand forward and reverse unit 14 and a left hand forward and reverse unit 15.

As shown diagrammatically in FIGURE 1, the engine shaft 17 is connected by the converter housing 18 to the pump element 19 of the torque converter 10. The pump element 19 drives the turbine element 21 which is connected by a hub 22 to the converter output shaft 23. The torque converter 10 has a stator which may be of the dual type having a first stator element 25 and a second stator element 26 connected respectively by one way clutches 27, and 28, to the ground sleeve 29 which is fixed to the housing.

The converter output shaft 23, which provides the input for the three speed transmission unit 11, drives a first sun gear 31 and a second sun gear 32. The first sun gear 31 meshes with a plurality of planetary pinions 34 mounted on the output carrier 36. A ring gear 37 meshes with the planetary pinions 34 and is connected to a carrier assembly 38 and to the low ratio ground clutch 39 which when engaged holds the ring gear stationary to provide low ratio drive. The second sun gear 32 meshes with a plurality of planetary pinions 42 mounted on the carrier assembly 38. The ring gear 43 meshes with the planetary pinions 42 and may be connected to ground by the intermediate ratio ground clutch 44 for intermediate ratio. The carrier assembly 38 may be connected by the direct drive or third ratio clutch 48 to a hub 49 connected to the shaft 23 to provide direct drive in this transmission unit.

The output carrier 36 is connected to the output gear 51 which drives the output pinion 52 providing a reduction drive to the connecting shaft 54 which is connected by bevel gears 56 to the cross shaft 57.

In the three ratio transmission unit 11 low or first ratio is provided by engaging clutch 39, the other clutches being disengaged to hold the ring gear 37. Then the converter shaft 23 rotates the first sun gear 31 and the carrier 36 at a reduced ratio. The second or intermediate ratio is provided by engaging clutch 44, the other clutches being disengaged to hold the ring gear 43. The converter output shaft 23 then drives the second sun gear 32 to rotate the planetary pinions 42 and carrier assembly 38 and the attached ring gear 37. Since the converter output shaft 23 is also rotating the first sun gear 31, the planetary pinions 34 and output carrier 36 will be rotated at an intermediate or second ratio due to the fact that a ring gear is rotating instead of being held stationary as in low ratio. Direct drive or third ratio is provided by engaging clutch 48, the other clutches being disengaged to rotate the carrier assembly 38 with the converter output shaft 23 to lock up the three speed planetary gear unit to provide direct drive to the output carrier 36.

The cross drive input shaft 57 is connected at opposite ends to the right hand cross drive unit 14 and left hand cross drive unit 15 each of which provides forward and reverse drive and braking. Since these units are the same but on different hand like reference numerals are employed. The cross drive input shaft 57 is connected to a reverse sun gear 61 and a forward sun gear 62. The reverse planetary gear unit has a plurality of planetary pinions 64 meshing with the sun gear 61 and mounted on a carrier 66 which may be held stationary by ground clutch 67 for reverse drive. Reverse clutch 67 holds carrier 66 so that the reverse sun gear 61 rotates pinions 64 to drive the ring gear 69 and associated carrier 71 and output shaft 72 at a reduced speed in a reverse direction.

The planetary pinions 64 also mesh with the ring gear 69 mounted on a carrier assembly 71 which is connected to the output shaft 72. In the forward gear set the planetary pinions 74 which mesh with the forward sun gear 62 are mounted on the carrier assembly 71. A ring gear 76 meshes with the planetary pinions 74 and may be connected by ground clutch 78 to ground to stop rotation of the ring gear 76 causing forward rotation of carrier 71 and shaft 72 to provide a reduction forward drive. The forward and reverse gear sets when constructed with the gears having the approximate diameters shown provide substantially the same reduction ratio. Vehicle brakes 81 are connected by hub 82 to output shaft 72.

Hydraulic Control System

The hydraulic control system provides a manually operated hydraulic control for the three ratio transmission unit 11 and a steering control system illustrated in FIGURE 3 controlling the cross drive transmission unit 12. Referring to FIGURE 2, fluid such as lubricating oil in the sump 91 is supplied through pump inlet line 92 to the input driven pump 93 which supplies fluid under pressure to main line 94. The main line has one branch 95 having a filter 96 therein and another branch 97 both of which are connected to the pressure regulator valve 101. The branch 95 is connected through the chamber of check valve 102 and the control port 103 of the regulator valve 101 to the supply line 104. The branch 97 is connected to the relief port 106 of the regulator valve 101 which provides a continuous connection through passage 107 to the inlet of valve 102 in order to permit flow from the pump 92 to the regulator valve when the filter 96 is clogged. The fluid pressure in the regulator port 103 passes through the check valve passage 109 to act on the end of the valve to move it against the spring 111. The check valve passage 109 and a clearance around the end land of the regulator valve element provide a dash pot action to prevent excessive valve vibration. The fluid pressure acting on the end of the regulator valve first moves the valve to connect regulator port 103 to the converter supply line 114 and then to connect the branch line 97 through the ports 115 to the exhaust 116 which returns the fluid to the sump 91 to control the pressure in supply line 104. For a more complete explanation of this regulator valve unit 101 reference should be made to the copending application, Serial No. 551,068, filed December 5, 1955 by Ulysses A. Breting and Robert M. Tuck.

The supply line 104 is connected to the manual selector valve 121. The valve element 122 which is moved by a ratio lever has lands *a*, *b*, *c*, *d*, and *e* of uniform diameter located in bore 123. Supply line 104 is connected in all valve positions to the space between the lands *d* and *e* and through ports 124, a central bore 125 and port 126 to the space between the lands *b* and *c*. In the neutral position shown, the flow is blocked between the lands *b* and *c*. The valve element 122 which is movable from the neutral position to low, intermediate and high positions connect the space between the lands *b* and *c* respectively to the low clutch line 131, the intermediate clutch line 132 and the high clutch line 133. When the clutch lines are not connected to the supply line they are connected to either exhaust 134 or 135. The spring detent mechanism 136 employs balls resiliently urged to cooperate with annular grooves in the valve element to position the valve element in each operative position.

The low clutch line 131 is connected to the low clutch motor 141 consisting of a cylinder and piston. The piston operates the clutch 39 through the Belleville lever spring 142 which provides a mechanical advantage to increase the clutch actuation pressure and acts as a retraction spring to return the piston. The intermediate clutch line 132 is connected to the motor 144 having an offset annular cylinder and a L shaped piston actuating the clutch 44 through an annular lever spring 146. The high clutch line 133 is connected to the motor 147 consisting of a cylinder and a piston having a portion directly engaging the plates of the high clutch 48. A retraction spring 148 returns the piston of motor 147.

The converter supply line 114 is connected between the second stator 26 and pump element 19 to a converter chamber. The fluid leaves the converter chamber between the turbine element 21 and the stator element 25 via line 151 which is connected through cooler 152 to the lubrication line 153, which may supply lubrication to the gearing in the main transmission unit 11 and the cross drive unit 12. The line 153 is connected through the pressure control valve 154 which maintains pressure in the lubricating line, to the return line 156 and to the sump 91.

The control system for the cross drive unit has a right and left hand forward and reverse lever providing an independent selection of either forward or reverse drive in the right hand gear unit 14 or the left hand gear unit 15, to provide either forward drive when both units are in forward or reverse drive when both units are in reverse or a pivot turn when one unit is in forward and the other is in reverse. The cross drive unit also has right and left hand brakes 81 actuated respectively by right and left hand brake levers which may be employed simultaneously to operate as vehicle service brakes to stop the vehicle or individually to provide steering. Under either condition of brake operation the application of a brake in either or both units automatically discontinues the supply of fluid to both the forward and reverse clutches to discontinue the drive of the unit being braked.

The cross drive control system as illustrated in FIGURE 3 is supplied with operating fluid by the supply line 104 which is connected to the control valve 161 which normally supplies fluid to a right hand supply line 162 and the left supply line 163. The right supply line 162 is connected to a right hand trimmer valve 166 and a right hand forward and reverse selection valve 167 for controlling the right hand forward and reverse gear 14. The left hand supply line 163 is connected to a left hand trimmer valve 169 and a left hand forward and reverse selector valve 171 which controls the flow of fluid to actuate the left hand forward and reverse gear 15. The left hand brake 81 has an actuator valve 173 which controls the flow of fluid through the actuator line 174 connected to the control valve 161. The right hand brake 81 has a similar actuator valve 176 connected by right hand actuator line 177 to the control valve 161. Since the right hand valves, forward and reverse gear and brake units are similar to the left hand units, only the left hand units are shown and described in detail.

The neutral control valve 161 which controls both the right and left hand units has a bore 181 having located therein a right hand valve element 182 and a left hand valve element 183. The right element 182 is urged by a spring 184 and the left element 183 is urged by a spring 185 toward the center of the bore 181 against abutment or stop pin 186. The supply line 104 is connected to a supply port 189 located between the valve elements 182 and 183 and feeds a central bore 191 having an orifice 192 in the right element 182 and a central bore 193 having an orifice 194 in the left hand element 183. In the neutral position of the valve unit 161 the right hand valve element 182 has a port 197 connecting the bore 191 to the right hand supply line 162 and the left hand valve element 183 has a port 198 connecting the bore 193 to the right hand supply line 163. The bore 181 is closed at both ends and the right end is connected to the actuator line 177 while the left end is connected to the actuator line 174. When the brakes are released the actuator valves 173 and 176 block flow through actuator lines 174 and 177 respectively, and the springs hold the valves 182 and 183 in neutral position. On engagement of the brakes actuator valves 173 and 176 open permitting flow through lines 174 and 177 and orifices 194 and 192 respectively. The pressure drop across these orifices causes the valves 182 and 183 to move to the vent position. On movement of the right hand valve element 182 to the vent or neutral position the port 197 is blocked and the right hand supply line 162 is connected to exhaust 201 disengaging the right forward and reverse clutches. Similarly the left hand valve element 183 when in the neutral position blocks the flow from the supply line 104 and the bore 193 through the port 198 and connects the left hand supply line 163 to the exhaust 202 disengaging the left forward and reverse clutches.

The left hand supply line 163 is connected to a trimmer valve 169 having a piston 206 located in a bore 207, and resiliently urged by the spring 208 against the shoulder 209. The spring 208 seats in a piston 211 which is slidably mounted in a coaxial bore or spring chamber 212. The line 163 is connected by a branch line 214 through an orifice 215 to permit a slow increase in the pressure acting on the piston 211 to move it toward the valve element 206 to slowly increase the spring force on the valve. The orifice 215 may be by-passed by a check valve (not shown) to permit rapid evacuation of the fluid acting on the abutment piston 211. The valve element 206 in the closed position shown blocks the flow from the supply line 163 to exhaust 218. However, when pressure in line 163 rises above the low pressure regulated by the spring 208 with the abutment 211 in the position shown at the bottom of bore 212 the valve 206 will move to a second position permitting the escape of fluid through exhaust 218 to reduce the line pressure to the low regulated value. Thus on an initial application of the clutch, the initial rise of pressure in line 163 is limited until fluid can flow through branch line 214 and orifice 215 to act on the movable abutment 211 to increase the spring pressure acting on valve 206. When this occurs, line 163 is gradually restored to the full pressure available.

The left hand supply line 163 has two additional branches connecting it to opposite ends of the bore 220 of the left hand forward and reverse selector valve 171. The selector valve element 221 which is moved by the left forward and reverse lever has lands a, b, c, d and e of equal diameter and a large central land c located between the lands b and d. With the valve element 221 in the neutral position shown, the land a is located in the small diameter bore portion 222 blocking the forward inlet port 223 which is connected to the supply line 163, and the land e at the other end of the valve element is located in the bore 224 blocking the reverse inlet port 226 which is also connected to the supply line 163. The forward clutch port 228 is located in the bore 222 between the lands a and b and connected to the forward clutch line 229. The reverse clutch port 331 is located in the bore 224 between the lands d and e and is connected to the reverse clutch line 332. The T shaped reverse lubrication port 336 is located in the large diameter bore 225 adjacent the small bore 224 and is connected to the reverse clutch lube line 337. The forward clutch lubricating port 338 is located in the large bore 225 between the shoulder provided by the small bore 222 and is connected to the forward clutch lubricating line 339. The lands b and d respectively fit the bores 222 and 224 to cut off flow to the lubrication ports 336 and 338. The valve is held either in the neutral position shown or in a forward or reverse position by the ball detent mechanism 341 which consists of a plurality of balls resiliently urged into annular clutches in the external surface of the land c. A small clearance between the annular land c and the valve element 221 between the lands b and d or between land c and bore 225 provides a dash pot action retarding movement of the valve after the lands b or d enter the respective small bores and also prevents a fluid lock permitting return movement of the valve elements.

The forward and reverse valve 171 in the neutral position shown disengages the forward clutch 78 and the reverse clutch 67 to place the gear unit 15 in neutral. Flow of fluid from main line 163 is blocked at port 223 by land a and at port 226 by land e. The reverse motor 347 is connected by line 332, port 331, bore 225, port 336 and line 337 to exhaust. The forward motor 346 is connected by line 229, port 228, bore 225, port 338 and line 339 to exhaust. To provide reverse drive the valve element 221 is moved further into the bore 220 so that land e uncovers port 226 permitting fluid to flow to bore 224 and simultaneously via port 331 and line 332 to actuate motor 347 to engage clutch 67 for reverse drive and at the same time via port 336, and line 337 to flow over the plates of clutch 67 for cooling and exhaust to the sump. The port is T-shaped to provide a large initial flow and to limit the pressure increase in motor 347. During initial movement of valve element 221 land c covers the major area of port 336 to quickly reduce the cooling fluid flow and quickly increase the pressure in line 332 to actuate motor 347. This action continues at a reduced rate until clutch 67 is engaged. Then land d enters bore portion 224 stopping flow to the cooling line 337 and trapping fluid in bore 225 which acts on land c to retard further movement of the valve element 221. The trapped fluid leaks slowly out of port 336 or about land c or between annular land e and the portion of valve element 221 forming both lands b and d to permit final movement of the valve element to the reverse detent position. During this movement to engage the reverse clutch 67 the connections to the forward clutch motor 346 remain unchanged. The valve element 221 is moved out of bore 220 and operates in a similar manner to engage the forward clutch 78.

The left hand forward clutch line 229 is connected to the clutch motor 346 which consists of a cylinder and a piston directly engaging the plates of a left hand clutch 78. The lubricating line 339 is connected to supply fluid directly to the plates of clutch 78. The reverse clutch line 332 is connected to the fluid motor 347 comprising a cylinder having a piston therein directly engaging the plates of the left hand reverse clutch 67. The left hand reverse clutch lubricating line 337 is connected to supply lubricating fluid directly to the plates of the left hand reverse clutch 67. The right hand forward and reverse selector valve 167 is similarly constructed and connected to the right hand forward and reverse gear 14.

The brakes 81 are actuated manually by individual brake levers connected by a hydraulic or linkage system to arm 348 on the brake actuating ring 349. The ring 349 and housing portion 350 have complementary cam grooves engaging balls or rollers which on rotary movement of ring 349 move the ring away from housing 350 to engage the plates against the fixed abutment portion 361 of the housing and apply brake 81. The actuator valve unit 173 associated with the left hand brake 81 normally closes the left hand actuator line 174 when the brake is released. The valve element 351 is located in an axial bore 357 in the ring 349. The valve element 351 has at one end a head 352 resiliently held against the seat 353 by a spring 354 located between the seat 353 and an abutment 356 on the other end of the valve element 351. The valve 173 is thus closed blocking actuator line 174 when the brake is released. When the right hand brake 81 is engaged by rotating cam ring 349, the cam ring moves away from housing portion 350 and contacts the end plate of left hand brake 81 to engage the brake and engage the abutment 356 to move the valve 351 against the spring 354 to lift the head 352 off the seat 353 connecting the left hand actuator line 174 to exhaust 366. The right hand brake unit 81 and actuator valve 176 are similarly constructed and operate in the same manner.

*Operation*

During normal straight forward drive when neither brake 81 is applied the supply line 104 is connected through the bore 191 and port 197 of the right hand control valve 182 to the right hand supply line 162 to supply the right hand selector valve 167 and through the bore 193 and port 198 of the left hand control valve 183 to the left hand supply line 163 to supply the left selector 171. For forward drive both selector valves 167 and 171 are manually positioned in the forward position to engage the right and left forward clutches 78 and for reverse drive both selector valves are positioned in reverse position to engage both reverse clutches 67.

A pivot steer condition may also be obtained without employing the brakes by positioning one selector valve in forward and the other selector valve in reverse to provide forward drive in one unit and reverse in the other unit.

For steering one of the brakes is manually applied and the associated drive unit is automatically disengaged. When for example the left hand brake 81 is engaged the end plate will open actuator valve 351 to vent actuator line 174 to exhaust 366. Then the flow from the supply line 104 through bore 193 and orifice 194 to the actuator line 174 creates a pressure differential across the orifice 194 causing the left hand neutral control valve 183 to move from the drive position to the neutral position thereby disconnecting the supply of fluid from the supply line 104 to the left hand supply line 163 and connecting the line 163 to exhaust 202. Since the supply line 163 is employed to supply both the forward and reverse clutch of the left hand gear unit 15 the drive would be disconnected if the vehicle was in forward or reverse and would be held disconnected if the vehicle was in neutral when the brake is applied. Similarly engagement of the right hand brake will open the actuator valve 176 to move the control valve 182 to vent the right hand supply line 162 and release any drive in effect in the right hand forward and reverse unit 14. When the brakes are used simultaneously as vehicle service brakes both of the actuator valves 173 and 176 will be opened and both control valves 182 and 183 will be moved to the neutral position venting both the right hand and left hand supply lines 162, 163 to disengage both forward and reverse gears to place the cross drive unit in neutral.

The valves are shown individually to simplify the drawing. It is the usual practice to form all the valves in one body and to employ bores therein to connect the valve ports. The relative position of the valves is not critical and descriptive words like "top" or "upper" are merely used for convenience.

The above described preferred embodiment is illustrative of the invention which may be modified within the scope of the appended claims.

I claim:

1. In a transmission, an input member, an output member, a fluid actuated gear unit providing a forward and a reverse drive connecting said input member to said output member, a brake having an engaged and a disengaged position operatively connected to said output member, a source of fluid under pressure, control valve means connected respectively to said gear unit and having a forward position to engage said forward drive and a reverse position to engage said reverse drive of said gear unit, a neutral valve having a valve element axially movably mounted in a bore and biased to a drive position connecting said source to said control valve means and movable to a neutral position venting said control valve means, said valve element having a restricted passage extending axially through the valve element to provide a pressure differential on the flow of fluid through said restricted passage in one direction to move said valve element in the direction of the flow from said drive to a neutral position, means connecting said source to said bore for flow through said restricted passage, and actuator means actuated by said brake in the disengaged position to stop said flow through said restricted passage and in the engaged position to permit flow through said restricted passage.

2. In a transmission, an input member, first and second output members, a first and a second fluid actuated gear unit providing a forward and a reverse drive connecting said input member respectively to said first and second output members, a first and second brake having an engaged and a disengaged position operatively connected respectively to said first and second output members, a source of fluid under pressure, a first and second control valve means connected respectively to said first and second gear units and each having a forward position to engage said forward drive and a reverse position to engage said reverse drive of its connected gear unit, a neutral valve having a first and second valve element axially movably mounted in a bore and both biased to a central position connecting said source respectively to said first and second control valve means and movable individually to a first position venting said respective control valve means, said first and second valve elements having a restricted passage extending axially through the valve element connecting the central portion of said bore with the respective first and second ends of said bore to provide a pressure differential on the flow of fluid through said restricted passage to move said valve element in the direction of the flow from said central to a first position, means connecting said source to said bore between said first and second valve elements in both positions for flow through said restricted passages respectively to the first and second ends of said bore, first actuator means actuated by said first brake in the disengaged position to close and in the engaged position to vent said first end of said bore to control the flow through said restricted passage, and second actuator means actuated by said second brake in the disengaged position to close and in the engaged position to vent said second end of said bore to control the flow through said restricted passage.

3. In a transmission, an input member, first and second output members, a first and a second fluid actuated gear unit providing a forward and a reverse drive connecting said input member respectively to said first and second output members, a first and second brake having an engaged and a disengaged position operatively connected respectively to said first and second output members, a source of fluid under pressure, a first and second control valve means connected respectively to said first and second gear units and each having a forward position to engage said forward drive and a reverse position to engage said reverse drive of its connected gear unit, a first and second neutral valve each having an element axially movably mounted in a bore and biased to a drive position connecting said source respectively to said first and second control valve means and movable to a neutral position venting said respective control valve, each valve element having a restricted passage extending axially through the valve element to provide a pressure differential on the flow of fluid through said restricted passage in one direction to move said valve element in the direction of the flow from said drive position to a neutral position, means connecting said source to said first and second neutral valves for flow through said restricted passages in said one direction, first actuator means actuated by said first brake in the disengaged position to stop flow through said first restricted passage and in the engaged position to permit flow through said first restricted passage to control the position of said first valve element, and second actuator means actuated by said second brake in the disengaged position to stop flow through said second restricted passage and in the engaged position to permit flow through said second restricted passage to control the position of said second valve element.

4. In a transmission, an input member, an output member, a fluid actuated gear unit providing a drive connecting said input member to said output member, a brake having an engaged and a disengaged position operatively connected to said output member, a source of fluid under pressure, means to supply fluid to said gear unit to engage and disengage said drive, a valve having a valve element movably mounted in a bore and biased to a drive position controlling the supply of fluid from said source to said means and said gear unit to establish said drive and movable to a neutral position controlling the supply of fluid from said source to said means and said gear unit to establish neutral, said valve having means including a restricted passage to provide a pressure differential created only during the flow of fluid through said passage acting on said valve element to move said valve element from said drive to a neutral position, means connecting said source to said passage, and actuator means actuated by said brake in the brake disengaged position to stop said flow through said passage and in the brake engaged position to permit continuous flow through said passage throughout the period of brake engagement.

5. In a transmission for a vehicle, an input shaft extending longitudinally of the vehicle, a cross shaft and a pair of output shafts extending transversely of said vehicle, a transmission unit extending longitudinally of the vehicle providing a plurality of torque ratio drives connected to drive said cross shaft, a pair of drive means including gear units providing a plurality of torque ratio drives driven by said cross shaft and each driving one of said output shafts, a brake having movable friction engaging members one of which is operatively movable to engage the other to retard each output shaft, and means actuated by the engaging movement of said one movable friction engaging member for engagement of each of said brakes to control the disconnection of the drive means to the output shaft retarded by that brake.

6. In a transmission for a vehicle, an input shaft extending longitudinally of the vehicle, a cross shaft and a pair of output shafts extending transversely of said vehicle, a transmission unit extending longitudinally of the vehicle providing a plurality of torque ratio drives connected to drive said cross shaft, a pair of drive means including gear units providing a plurality of torque ratio drives driven by said cross shaft and each driving one of said output shafts, a brake having movable friction engaging members one of which is operatively movable to engage the other to retard each output shaft, and means directly connected to and moved by the engaging movement of said one movable friction engaging member for engagement of each of said brakes to control the disconnection of the drive means to the output shaft retarded by that brake.

7. In a transmission for a vehicle, an input shaft extending longitudinally of the vehicle, a cross shaft and a pair of output shafts extending transversely of said vehicle, a transmission unit extending longitudinally of the vehicle including a fluid torque converter unit, a gear unit providing a plurality of ratios and output means connected to drive said cross shaft, ratio control means operatively connected to said gear unit to select said ratio, a pair of drive means including forward and reverse gear units driven by said cross shaft and each driving one of said output shafts, a pair of forward and reverse controls each connected to one of said forward and reverse gear units to select forward or reverse, a brake having movable friction engaging means operatively connected to each output shaft to retard each output shaft, and means actuated by movement of said movable friction engaging means during engagement of each of said brakes to control the disconnection of the drive means to the respective output shaft retarded by the respective brake.

8. In a transmission for a vehicle, an input shaft extending longitudinally of the vehicle, a cross shaft and a pair of output shafts extending transversely of said vehicle, a transmission unit extending longitudinally of the vehcle including a fluid torque converter unit, a gear unit providing a plurality of ratios and output means connected to drive said cross shaft, ratio control means operatively connected to said gear unit to select said ratio, a pair of drive means including forward and reverse gear units driven by said cross shaft and each driving one of said output shafts, a pair of forward and reverse controls each connected to one of said forward and reverse gear units to select forward or reverse, a brake having movable friction engaging means operatively connected to each output shaft to retard each output shaft, and means connected to and moved by movement of said movable friction engaging means during engagement of each of said brakes to control the disconnection of the drive means to the respective output shaft retarded by the respective brake.

9. In a transmission, an input member, an output member, a fluid actuated drive unit providing a drive connecting said input member to said output member, a brake having a brake member movable between an engaged and a disengaged position operatively connected to said output member, brake control means connected to said brake to control said brake member, a source of fluid under pressure, drive control means to control the supply of fluid from said source to said drive unit to in drive engaged position engage said drive and in drive disengaged position disengage said drive, valve means controlling the supply of fluid from said source to said drive control means biased to a drive position controlling the supply of fluid from said source to said drive control means to establish said engaged or disengaged drive condition in accordance with the position of said drive control means and movable to a neutral position controlling the supply of fluid from said source to said drive control means and said gear unit to disengage said drive regardless of the position of said drive control means, said brake control means being operable to engage said brake when said drive control means is in either position and actuator means actuated by said brake member in the brake disengaged position to place said valve in said drive position and said drive unit in the drive engaged or disengaged position accordingly as said drive control means is in the drive engaged or disengaged position respectively and actuated by said brake member in the brake engaged position to place said valve in said neutral position.

10. In a transmission, an input member, an output member, a fluid actuated gear unit providing a first and a second drive connecting said input member to said output member and a neutral condition disconnecting said input and output members, a brake having a brake member movable between an engaged and a disengaged position operatively connected to said output member, brake control means connected to said brake to control said brake member, a source of fluid under pressure, drive control means to control the supply of fluid from said source to said gear unit to in a first engaged position to engage said first drive, and in a second engaged position to engage said second drive, a valve biased to a drive position controlling the supply of fluid from said source to said drive control means to permit establishment of said first or second drive condition in accordance with the position of said drive control means and movable to a neutral position controlling the supply of fluid from said source to said drive control means and said gear unit to establish neutral condition regardless of the position of said drive control means, said brake control means being operable to engage said brake when said drive control means is in either position and actuator means actuated by said brake member in the brake disengaged position to place said valve in said drive position and said gear unit in said first or second drive accordingy as said drive control means is in said first or second engaged position respectively and actuated by said brake member in the brake engaged position to place said valve in said neutral position.

11. The invention defined in claim 10 and said first drive being a forward drive and said second drive being a reverse drive.

12. In a transmission, an input drive, an output drive, a drive unit connecting said input drive to said output drive having a disengaged position and an engaged position including drive control means operatively connected to said drive unit to control said drive unit to selectively position said drive unit in the engaged and disengaged position, a brake having friction means movable between an engaged and a disengaged position operatively connected to said output drive to retard said output drive in the engaged position, brake control means directly connected to said friction means to selectively position said friction means of said brake in the engaged and disengaged positions, and actuator means directly connected to said friction means and connected to said drive unit and operative in response to the position of said brake friction means in the engaged position to control said drive unit to disengage said drive unit.

13. In a transmission, an input drive, a pair of output drives, a pair of drive units each connecting said input drive to one of said output drives and having an engaged position providing a drive and a disengaged position disconnecting the drive and including means to selectively control said drive units to control said drive units to provide said engaged and disengaged positions, a brake operatively connected with each output drive having friction means movable from a disengaged position to an engaged position to engage said brake, brake control means directly connected to said friction means of said brake to move said friction means between the engaged and the disengaged positions, and actuator means directly connected to said friction means and connected to said drive unit and operative in response to the position of said brake friction means in the engaged position to control said drive unit to disengage said drive unit.

14. In a transmission; an input drive; an output drive; a drive unit connecting said input drive to said output drive having a disengaged position and an engaged position including drive control means operatively connected to said drive unit to control said drive unit to selectively position said drive unit in the engaged and disengaged position; a brake having friction means movable between an engaged and a disengaged position operatively connected to said output drive to retard said output drive in the engaged position; brake control means connected to said friction means and operative when said drive unit is disengaged and engaged to selectively position said friction means of said brake in the engaged and disengaged positions; and actuator means connected to said friction means and connected to said drive unit and operative in response to the position of said brake friction means in the engaged position to control said drive unit, when said drive unit is in the engaged position, to move the drive unit to the disengaged position, and when said drive unit is in the disengaged position, to hold the drive unit in the disengaged position.

15. In a transmission; an input drive; an output drive; a drive unit connecting said input drive to said output drive having a disengaged position and an engaged position including drive control means operatively connected to said drive unit to control said drive unit to selectively position said drive unit in the engaged and disengaged position; a brake having friction means movable between an engaged and a disengaged position operatively connected to said output drive to retard said output drive in the engaged position; brake control means directly connected to said friction means and operative when said drive unit is disengaged and engaged to selectively position said friction means of said brake in the engaged and disengaged positions; and actuator means directly connected to said friction means and connected to said drive unit and operative in response to the position of said brake friction means in the engaged position to control said drive unit, when said drive unit is in the engaged position, to move the drive unit to the disengaged position, and when said drive unit is in the disengaged position, to hold the drive unit in the disengaged position.

16. In a transmission, an input drive, a pair of output drives, a pair of drive units each connecting said input drive to one of said output drives and having an engaged position providing a drive and a disengaged position disconnecting the drive and including means to selectively control said drive units to provide said engaged and disengaged positions, a brake operatively connected with each output drive having friction means movable from a disengaged position to an engaged position to engage said brake, brake control means connected to said friction means of said brakes and operative when said drive unit is disengaged and engaged to selectively engage each of said friction means, and actuator means connected to said friction means and connected to said drive unit and operative in response to the position of said brake friction means in the engaged position to control said drive unit, when said drive unit is in the engaged position, to move the drive unit to the disengaged position, and when said drive unit is in the disengaged position, to hold the drive unit in the disengaged position.

17. In a transmission, an input drive, a pair of output drives, a pair of drive units each connecting said input drive to one of said output drives and having an engaged position providing a drive and a disengaged position disconnecting the drive and including means to selectively control said drive units to provide said engaged and disengaged position, a brake operatively connected with each output drive having friction means movable from a disengaged position to an engaged position to engage said brake, brake control means directly connected to said friction means of said brakes and operative when said drive unit is disengaged and engaged to selectively engage each of said friction means, and actuator means directly connected to said friction means and connected to said drive unit and operative in response to the position of said brake friction means in the engaged position to control said drive unit, when said drive unit is in the engaged position, to move the drive unit to the disengaged position, and when said drive unit is in the disengaged position, to hold the drive unit in the disengaged position.

18. In a transmission, an input member, an output member, a fluid actuated drive unit providing a drive connecting said input member to said output member, a brake having an engaged and a disengaged position operatively connected to said output member including a friction member movable between an engaged and a disengaged position, a brake control means operatively connected to said friction member of said brake to actuate said brake, a source of fluid under pressure, drive control means manually selectively operative to selectively control the supply of fluid to said gear unit to selectively engage and disengage said drive, a neutral valve having a valve element movably mounted in a bore to in a drive position control the supply of fluid from said source to said drive control means to render said drive control means selectively operative to control said gear unit to engage and disengage said drive and movable to a neutral position to control the supply of fluid from said source to said drive control means to render said drive control means operative to control said gear unit to disengage said drive to establish neutral, said valve having means responsive to pressure to move said valve element between said drive and neutral positions, and actuator means actuated by movement of said brake friction member to control the supply of fluid under pressure acting on said valve to in the brake disengaged position control said valve to place said valve in said drive position and in the brake engaged position to control said valve to place said valve in said neutral position.

19. In a transmission, an input member, an output member, a drive unit providing a drive connecting said input member to said output member including drive control means to engage and disengage said drive, a brake having an engaged and a disengaged position operatively connected to said output member, brake control means connected to said brake to selectively engage and disengage said brake, a source of fluid under pressure, a passage connected to said source, means responsive to the flow of fluid through said passage operatively connected to said drive unit to disengage said drive unit for the duration of flow through said passage, and means operatively connected to said passage and actuated by said brake to block said passage in the brake disengaged position to prevent flow through said passage and to permit flow through said passage in the brake engaged position.

20. In a transmission for a vehicle; an input shaft; an intermediate shaft; a pair of output shafts extending transversely of said vehicle; a transmission unit including a multiple torque ratio unit connecting said input shaft to drive said intermediate shaft at a plurality of forward torque ratios; a pair of gear units each having an input member driven by said cross shaft, a forward planetary gear means, a reverse planetary gear means and an output member driving one of said output shafts, each of said planetary gear means including a sun gear, a ring gear and a carrier having pinions meshing with said sun and ring gears, each of said input members driving a forward and a reverse sun gear, each of said output members being connected to a reverse ring gear and a forward carrier; reverse engaging means connected to each of said reverse carriers to retard said reverse carriers for reverse drive; forward engaging means connected to each of said forward ring gears to retard said forward ring gears for forward drive; the ratio of the diameter of the sun gear to the diameter of the ring gear of each of said forward planetary gear means being sufficiently larger than the same ratio of the reverse planetary gear means to provide equal reduction ratio drive in forward and reverse drive; a brake operatively connected to each output shaft to retard each output shaft; and means to selectively engage said brakes to provide steering in forward and reverse drive.

21. In a transmission for a vehicle, an input shaft, an intermediate shaft, a pair of output shafts extending transversely of said vehicle, a transmission unit including a multiple torque ratio unit connecting said input shaft to drive said intermediate shaft at a plurality of forward torque ratios, a pair of gear units each having an input member driven by said cross shaft, a forward gear drive and a reverse gear drive connected to drive an output member in forward or reverse to drive one of said output shafts and control means to selectively engage forward or reverse drive, said forward gear drive and said reverse gear drive of each unit providing equal reduction drive in forward and reverse drive, a brake operatively connected to each output shaft to retard each output shaft, and means operative when said drive units are operating in both forward and reverse drive to selectively engage said brakes and to disengage the engaged drive of said forward and reverse drive and on disengagement of said engaged brake to directly engage the one of said forward and reverse drive engaged prior to brake disengagement.

References Cited in the file of this patent
UNITED STATES PATENTS

| | | |
|---|---|---|
| 764,896 | Maxim | July 12, 1904 |
| 1,338,835 | Lake et al. | May 4, 1920 |
| 2,023,597 | Klocke et al. | Dec. 10, 1935 |
| 2,197,248 | Bonham et al. | Apr. 16, 1940 |
| 2,392,729 | Edge | Jan. 8, 1946 |
| 2,496,429 | Baker et al. | Feb. 7, 1950 |
| 2,569,651 | Bannan | Oct. 2, 1951 |
| 2,781,858 | Kelley et al. | Feb. 19, 1957 |